United States Patent

Hopkins et al.

Patent Number: 5,164,785
Date of Patent: Nov. 17, 1992

[54] HEADLIGHT AIMING APPARATUS AND DISPLAY

[75] Inventors: Evan L. Hopkins; Gregory A. Yotz, both of Emporia, Kans.

[73] Assignee: Hopkins Manufacturing Corporation, Emporia, Kans.

[21] Appl. No.: 652,940

[22] Filed: Feb. 8, 1991

[51] Int. Cl.⁵ .............................. G01J 1/00
[52] U.S. Cl. .............................. 356/121
[58] Field of Search .............. 356/121, 122, 394; 33/288, 355

[56] References Cited

U.S. PATENT DOCUMENTS

| | | |
|---|---|---|
| 2,162,010 | 6/1939 | Graham . |
| 3,077,139 | 2/1963 | Todd et al. . |
| 3,386,333 | 6/1968 | Preston . |
| 3,467,473 | 9/1969 | Preston . |
| 3,515,483 | 6/1970 | Irwin . |
| 3,532,432 | 10/1970 | Mansour . |
| 3,709,609 | 1/1973 | Spengler et al. . |
| 3,746,449 | 7/1973 | Schick . |
| 3,791,740 | 2/1974 | Proefrock . |
| 4,185,298 | 1/1980 | Billet et al. ............ 356/394 |
| 4,435,078 | 3/1984 | de Brabander et al. . |
| 4,609,939 | 9/1986 | Kozawa et al. . |
| 4,647,195 | 3/1987 | Ishikawa et al. . |
| 4,679,935 | 7/1987 | Fukuda et al. . |
| 4,744,655 | 5/1988 | Soika . |
| 4,948,249 | 8/1990 | Hopkins et al. . |
| 4,973,155 | 11/1990 | Masuda . |

FOREIGN PATENT DOCUMENTS 57-59125A  4/1982  Japan .
57-116235A  7/1982  Japan .

Primary Examiner—Richard A. Rosenberger
Assistant Examiner—Hoa Q. Pham
Attorney, Agent, or Firm—Calfee, Halter & Griswold

[57] ABSTRACT

An apparatus and method for aiming vehicle headlights and for visually displaying the illumination patterns of the headlights. A light beam is focused on a screen and the intensity of the light in each cell of a matrix of cells overlying the reflected light beam is sensed with an image sensor. An electrical signal is generated for each cell indicative of the intensity of the light beam in each cell. A computer compares at least some of the electrical signals to each other and with established criteria to determine whether the headlight is aimed within a prescribed degree of accuracy. The illumination pattern of a headlight is described by visually displaying at least some of the electrical signals i.e. the light intensities and their locations, on a display. The illumination pattern can be displayed as a series of isocandela lines, or can be displayed as a simulated headlight illumination pattern on a road surface. Exemplary objects can be included on the road surface at selected intervals to indicate relative distances. The headlight illumination pattern can be compared to a properly aimed, simulated headlight illumination pattern to indicate the necessary aiming correction. Digital and graphic indications of the relative deviations between the headlight illumination pattern and a properly aimed headlight illumination pattern are provided, as well as an aiming probe for centering the headlight relative to the lens.

14 Claims, 8 Drawing Sheets

HEADLIGHT AIMING APPARATUS AND DISPLAY

This invention relates to a method and apparatus for accurately aiming vehicle headlights in the course of vehicle manufacture or after the vehicle has been in use. In particular, the invention relates to measuring the light illumination pattern emitted by a vehicle headlight and presenting the pattern on a CRT display as a simulated headlight illumination pattern to determine if the aim of the headlight is within prescribed standards.

BACKGROUND

Vehicle headlights are designed to project high intensity beams of light in prescribed patterns to illuminate certain portions of the road in front of the vehicle. Generally, vehicles are equipped with a first pair of headlights for projecting so-called high beams of light to illuminate the entire width of the highway in front of the vehicle. A second pair of headlights projects so-called low beams of light that are directed downwardly and to the right of the high beam so as not to blind an oncoming motorist In some vehicles, high and low beam patterns are projected from the same lamps using different filaments.

In order to produce a desired illumination that maximizes visibility at night without producing excessive glare for oncoming motorists, the headlights must be properly aimed and produce a particular light pattern. Standards for headlight aiming and illumination patterns are prescribed by industrial groups, such as the Society of Automotive Engineers (SAE), and by governmental agencies In general, different aiming and illumination pattern standards have been prescribed for different geographical areas, such as North America and Europe.

Devices and methods for determining proper vehicle headlight aiming during vehicle manufacture and after vehicles have been in use are known. Two examples of known methods and apparatus are described in U.S. Pat. Nos. 3,515,483 to Irwin and 4,435,078 to de Brabander et al. These known devices employ a lens to focus a headlight light beam within a compact electro-optical unit. A number of discrete light intensity sensors are disposed within the optical system for sensing the intensity of light at a relatively small number of positions in the light beam.

In the '483 patent, the intensities of light detected by each of nine discrete light intensity sensors are compared in selected pairs to determine whether established aiming criteria are satisfied within a prescribed degree of accuracy. If the accuracy is not achieved, the position of the headlight is adjusted to achieve the proper aim. This method of comparing the relative intensities of different portions of the light pattern is referred to as the fractional balance method.

The '078 patent employs a variation of the fractional balance aiming technique. There, light intensities measured at about the same number of discrete points by discrete light intensity sensors are used directly in comparison tests, or are multiplied by fractional constants to determine whether a headlight is accurately aimed or not.

Another known method and apparatus for determining proper headlight aiming is shown in Hopkins, et al, U.S. Pat. No. 4,948,249. The light beam of a headlight is focused on a surface or screen and includes a video sensor for sensing the light intensity in each cell of a continuous matrix of cells that overlies the focused light beam. The video sensor produces an electrical signal, either in digital or analog form, for each cell The signal indicates the cell location and the light intensity in that cell. Analog signals, such as are produced by a charge coupled device, are preferably digitized. The digital signals, i.e. pixels, may be manipulated by a computer to determine headlight aiming accuracy, to correct inaccurate aiming, and to describe the illumination pattern of the headlight.

While the known methods and devices are useful in accurately aiming vehicle headlights, the devices are specifically designed to provide a graphical display of the actual headlight intensity pattern that describes the aim of the headlight being tested. The known devices are not readily adaptable to alternatively display the intensity pattern of a properly aimed headlight with respect to specifications of either the manufacturer or the regulating governmental agency. That is, the known methods and devices are limited in flexibility.

In addition, the known apparatus and methods are inadequate to describe the actual pattern of the light beam on a road surface and the location of exemplary objects that would be visible to the motorist before and after aiming correction In an era of increasing awareness regarding highway safety, it is important that a headlight aiming device provides accurate and rapid results, provides a method that impresses upon motorists the importance of proper headlight aiming, and provides a visual indication of the difference between the actual headlight intensity pattern and a properly aimed headlight intensity pattern.

Accordingly, it is an object of the present invention to provide a vehicle headlight aiming method and apparatus that provides a visual indication of the proper aim of the headlight with respect to applicable specification(s).

Another object of the invention is to provide a headlight aiming method and apparatus that provides a visual comparison between the actual and proper intensity patterns of the light beam on a road surface, and a visual indication of the relative distances the respective intensity patterns would illuminate along the road surface Still another object of the invention is a method and apparatus for readily measuring headlight intensity patterns.

Yet another object of the invention is the provision of apparatus and methods for measuring both headlight aim accuracy and headlight intensity patterns.

A further object of the invention is a headlight aiming method and apparatus in which errors in headlight aiming are indicated graphically and digitally on a CRT display as a deviation from the proper orientation, and in which correction measures are immediately indicated and observable on the display.

Another object of the invention is the production of a visual display of the intensity pattern of a headlight.

SUMMARY OF THE INVENTION

The objects of the invention are achieved in an apparatus in which the light beam of a headlight is focused on a surface or screen, and in which an image sensor senses the light intensity in each cell of a continuous matrix of cells that overlies the reflected light beam. The image sensor includes a charge coupled device (CCD) which produces an electrical signal in analog form for each cell. The signal indicates the cell location and the light intensity in that cell. The analog signals, i.e. pixels, may be digitized and then manipulated by a computer to determine headlight aiming accuracy, to correct inaccurate aiming, and to describe the illumination pattern of the headlight.

The computer is preferably a microprocessor programmed with software for applying recognized industrial or governmental standards to tests of headlight aiming and intensity patterns. Different or changed standards can readily be accommodated by adding or changing software in the computer without any mechanical change in the apparatus. Measurements of headlight aiming accuracy can be used to produce error signals indicative of the amount and direction of aiming error. The error signals may be displayed as an indication of relative displacement from the proper aim of the headlight.

Preferably the apparatus includes a probe for initially orienting a lens or focusing aperture relative to the headlight. The probe is pivotally connected to the housing of the lens or aperture and can be moved away from the lens or aperture after orientation of the headlight.

In the aiming and intensity pattern methods, low beam tests search the matrix of pixels to locate two cells having prescribed light intensity and geometric relationships. Orthogonal axes are drawn through the two points, when located. The location of the intersection of the axes is compared to a mechanical axis specified by the SAE or respective governmental agency to determine the accuracy of the aim. High beams are tested by separately balancing light intensities on opposite sides of a pair of orthogonal axes. Each axis is located to achieve the best balance of total light intensities on opposite sides of the axis The intersection of these axes is calculated and compared to a vehicle-specific mechanical axis to determine aim accuracy By displaying at least some of the pixels, i.e. light intensity versus location, the illumination pattern can be visually described either as a graphical display of an intensity pattern, or as a simulated light beam In particular, the intensity pattern may be described by a graphical display on a printer or a CRT. Isocandela contours may be easily plotted to illustrate the intensity pattern. Alternatively, a simulated light beam can be displayed on the CRT which illuminates an appropriate portion of a simulated road surface. The simulated light beam can be compared with the illumination of a properly oriented, simulated light beam to indicate the necessary aiming corrections.

DETAILED DESCRIPTION

Figure 1:
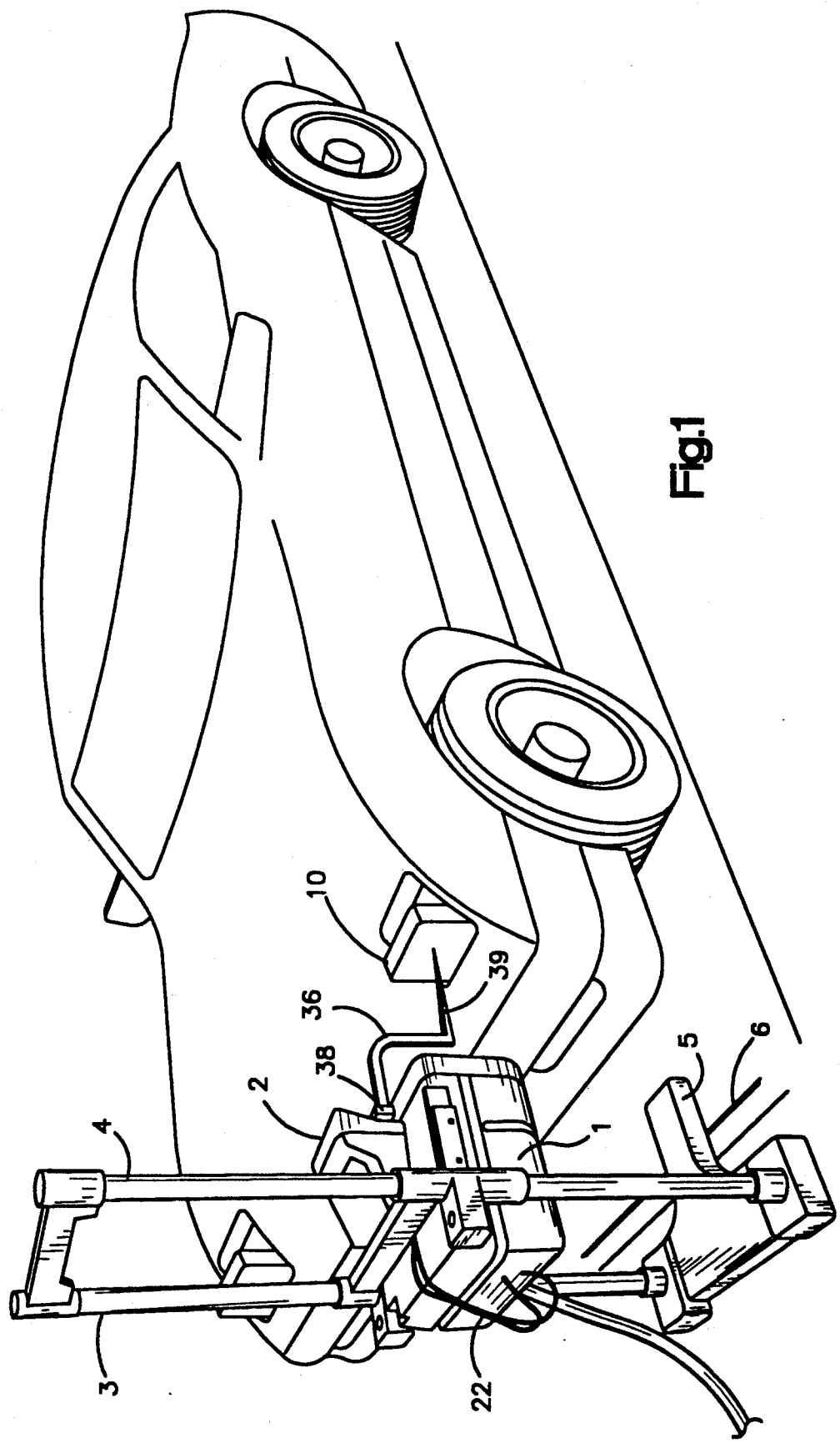
FIG. 1 is a perspective view of an apparatus according to the invention illustrating the method of aiming a vehicle headlight.
Figure 2:
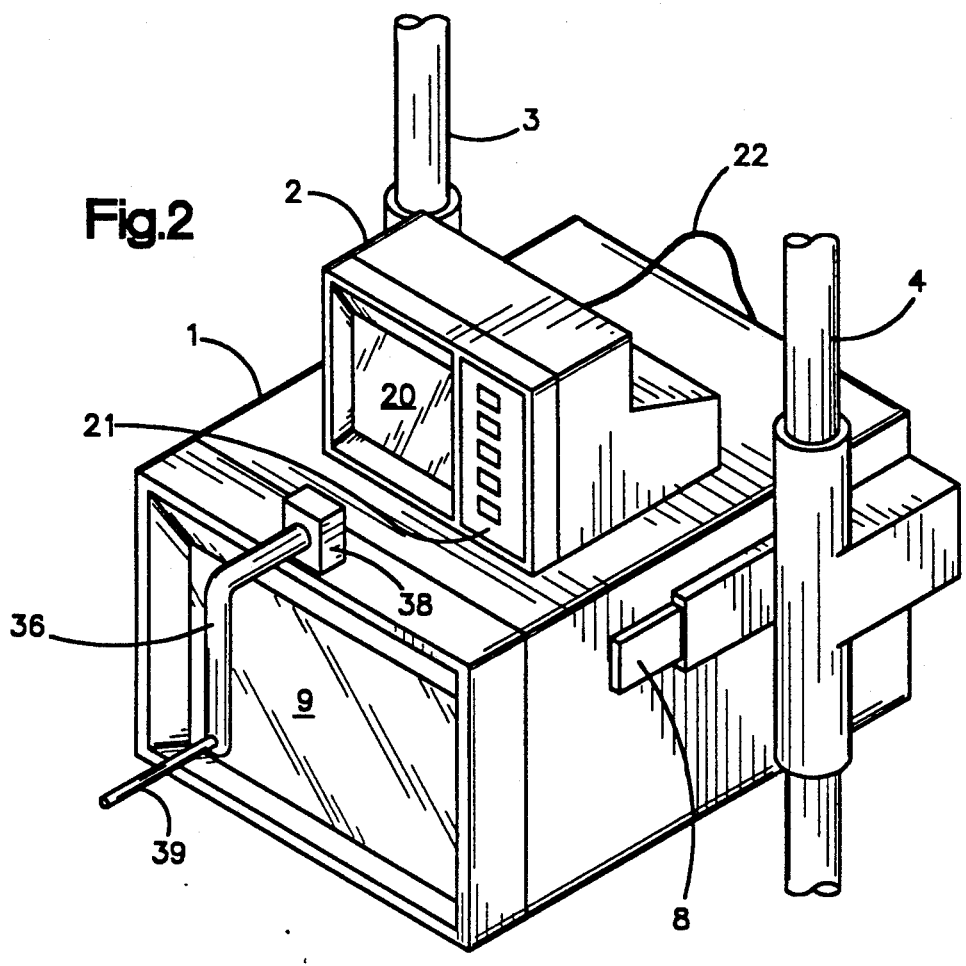
FIG. 2 is a close-up perspective view of a headlight aiming housing and a computer and CRT housing cooperatively mounted on a stand.

FIGS. 1 and 2 illustrate a perspective view of one aspect of the invention used in conjunction with a typical vehicle The invention includes two housings 1 and commonly mounted on a support including two generally vertical posts 3 and 4. Posts 3 and 4 extend upwardly from a base 5. The base can move transverse to the orientation of posts 3 and 4 on a track 6, such as is shown in Irwin, U.S. Pat. No. 3,515,483. That patent is incorporated herein by reference.

Although not shown, the base 5 can also include means of adjusting the attitude of housing 1. Angular compensation may be necessary to eliminate the effects of any deviation from a true horizontal position of a floor supporting a vehicle containing headlights to be aimed. Angular errors in the floor can produce errors in the aiming if not taken into account.

Referring now to FIG. 2, housing 1 can be adjusted vertically on posts 3 and 4 by means of a pair of releasable latches, of which only latch 7 is visible. Housing 1 can also be adjusted horizontally with respect to posts 3 and 4 by a pair of bearing-mounted, slidable arms, of which only arm 8 is visible.

At its front end, housing 1 includes a lens 9 for focusing a light beam of a vehicle headlight 10 (FIG. 1) within housing 1, as described herein in more detail. Lens 9 is positioned opposite headlight 10 by vertically or horizontally adjusting housing 1 as necessary and by moving base 5. Housing 1 includes Other optical and electronic components as explained in connection with FIG. 3. Like elements in all of the figures are given similar reference numerals with the understanding that the drawing figures are merely illustrative of some embodiments of the invention.

Figure 6:
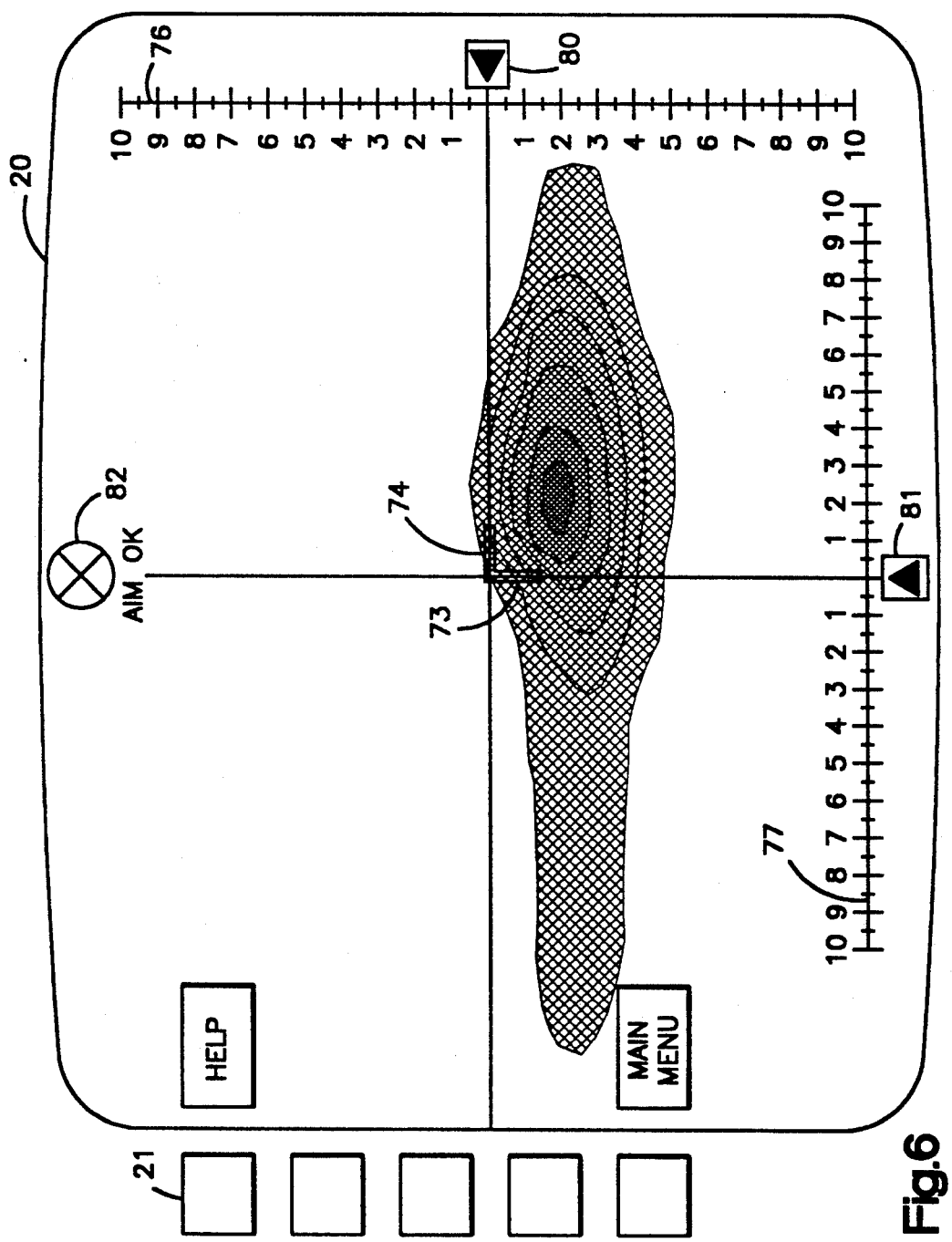
FIG. 6 is a graphical display on a CRT of an intensity pattern of a vehicle headlight produced according to the invention; illustrating a properly aimed vehicle headlight.

Housing 2 is supported by and mounted to housing 1. Housing 2 includes a CRT display 20 for displaying instructions, intensity patterns, error messages, etc. Adjacent CRT 20 in housing 2 is keyboard 21 which permits an operator to control the functioning of the apparatus, so that the headlights can be appropriately aimed and intensity patterns displayed. Indicia on the individual keys of keyboard 21 can be replicated on CRT display 20, for example, as shown in FIG. 6.

Referring again to FIG. 1, a computer that controls the functioning of the components mounted in housing 1 and housing 2, is also mounted in housing 2. Housing 1 and housing 2 are connected by a multiple conductor electrical cable 22. The components within housing 1 and and their interaction with each other can be better understood by reference to FIGS. 3 and 4.

Figure 3:
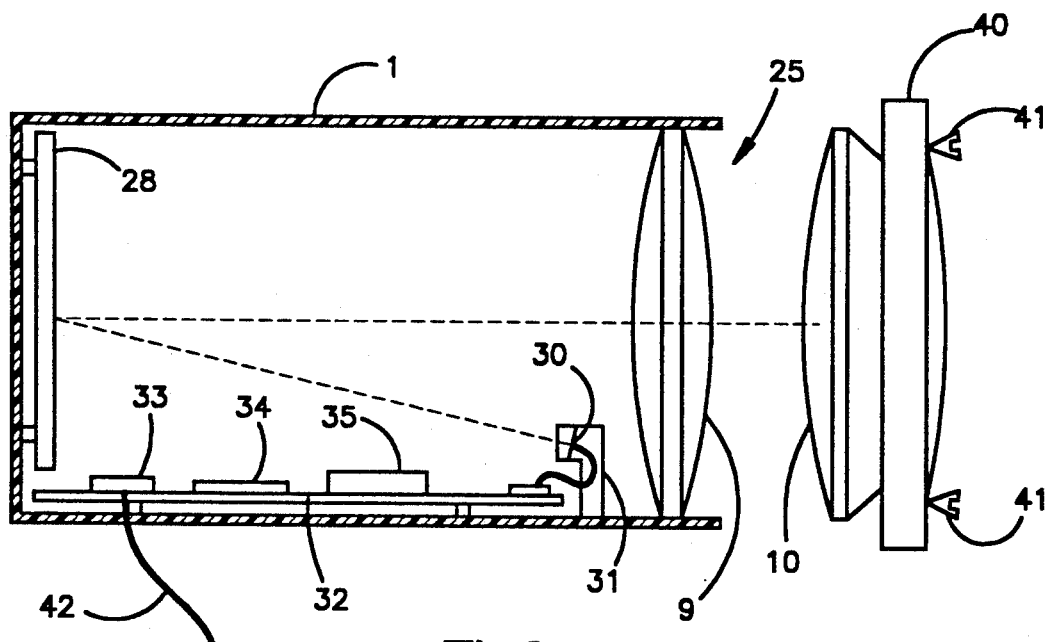
FIG. 3 is a side view, partially in section, of the headlight aiming housing and a headlight.

In FIG. 3, housing 1 has an open end, indicated generally at 25, in which lens 9 is mounted. Lens 9 is a converging lens that focuses a beam of light from vehicle headlight 10 onto a surface or screen 28 mounted within housing 1 opposite lens 9. Lens 9 is shown as a double convex converging lens, however a Fresnel lens can also be used in the apparatus. Lens 9 is relatively large so that it may capture nearly all of the light from headlight 10. Preferably lens 9 is larger in area than headlight 10 and may be made of glass or any transparent material.

SAE headlight aiming and headlight pattern tests specify test conditions in which the headlight beam is imaged on a surface spaced 25 feet from the headlight. Such a distant focusing surface requires an inordinate amount of space both in vehicle assembly operations and in vehicle service facilities. The focal length of lens 9 is chosen so that an image comparable to what would be formed 25 feet from headlight 10 is formed in a smaller size on screen 28. Nevertheless, lens 9 and screen 28 need only be separated by a relatively short distance, for example only a few feet, so that considerable space is saved. Because of compression of the image size and the sensing of its intensity in many cells within the image as described below, it is important that lens 9 introduce little distortion into the light beam.

The image formed on screen 28 is sensed by an image sensor 30 that is located within housing 1. Image sensor 30 includes a relatively large number of charged cells arranged in a matrix. The matrix of cells permits the intensity of the light beam to be measured across the width of the beam. For example, image sensor 30 could be a Charge coupled device (CCD) integrated circuit (IC) such as commercially available from Texas Instruments, model no. TC211.

A typical, commercially available CCD IC includes an integrated cell matrix and cell output circuitry. The CCD IC is mounted in a pin hole camera 31 and is in electrical communication with a latch and a microprocessor. The TC211 unit senses the intensity of a light beam incident on the IC, and stores that information, i.e. pixels, in an electron well on the IC. The memory elements include information relative to the proportion of light incident in every cell in the matrix of cells. The cells can be interrogated in a sequential fashion and can provide light intensity values in an analog format which may then be digitized.

The pin hole camera 31 of image sensor 30 is mounted on housing 1 and is electrically connected to circuit board 32. Circuit board 32 provides access to aim data and beam images through monitor and power port 33. Calibration to the system is provided through calibrate port 34. Software updates can be provided through expansion port 35.

As is apparent from FIG. 3, it is important to center headlight 10 relative to lens 9, or a focusing aperture if no lens is used, to form the proper image for headlight aiming and intensity pattern measurements. To this end, as shown in FIGS. 1 and 2, proper alignment may be achieved with the aid of an aiming probe 36. Aiming probe 36 is pivotally mounted on pivot pin 38 attached to housing 1. Probe 36 can be pivotally moved from a position alongside the housing 1 to a position substantially centered with respect to lens 9. The probe 36 includes a pointer 39 extending along the axial centerline of lens 9. The pointer 39 can be oriented with a center mark (not shown) on headlight 10. Housing 1 can be adjusted relative to headlight 10 using track 6, latches 7, and arms 8 until probe 39 is properly oriented with the headlight center mark.

In FIG. 3, headlight 10 is shown schematically and adjustably mounted in a frame 40 on the front end of a typical vehicle (not shown). The position of headlight 10 within frame 40 is controlled by the relative positions of adjusting screws 41. While only two adjusting screws are shown, a headlight mounting may have three or more adjusting screws which provide independent adjustment of the vertical and horizontal orientation of headlight 10. To correct the aim of headlight 10 in a particular direction and by a particular amount, an appropriate screw is tightened or untightened to effect the desired aiming correction.

Figure 4:
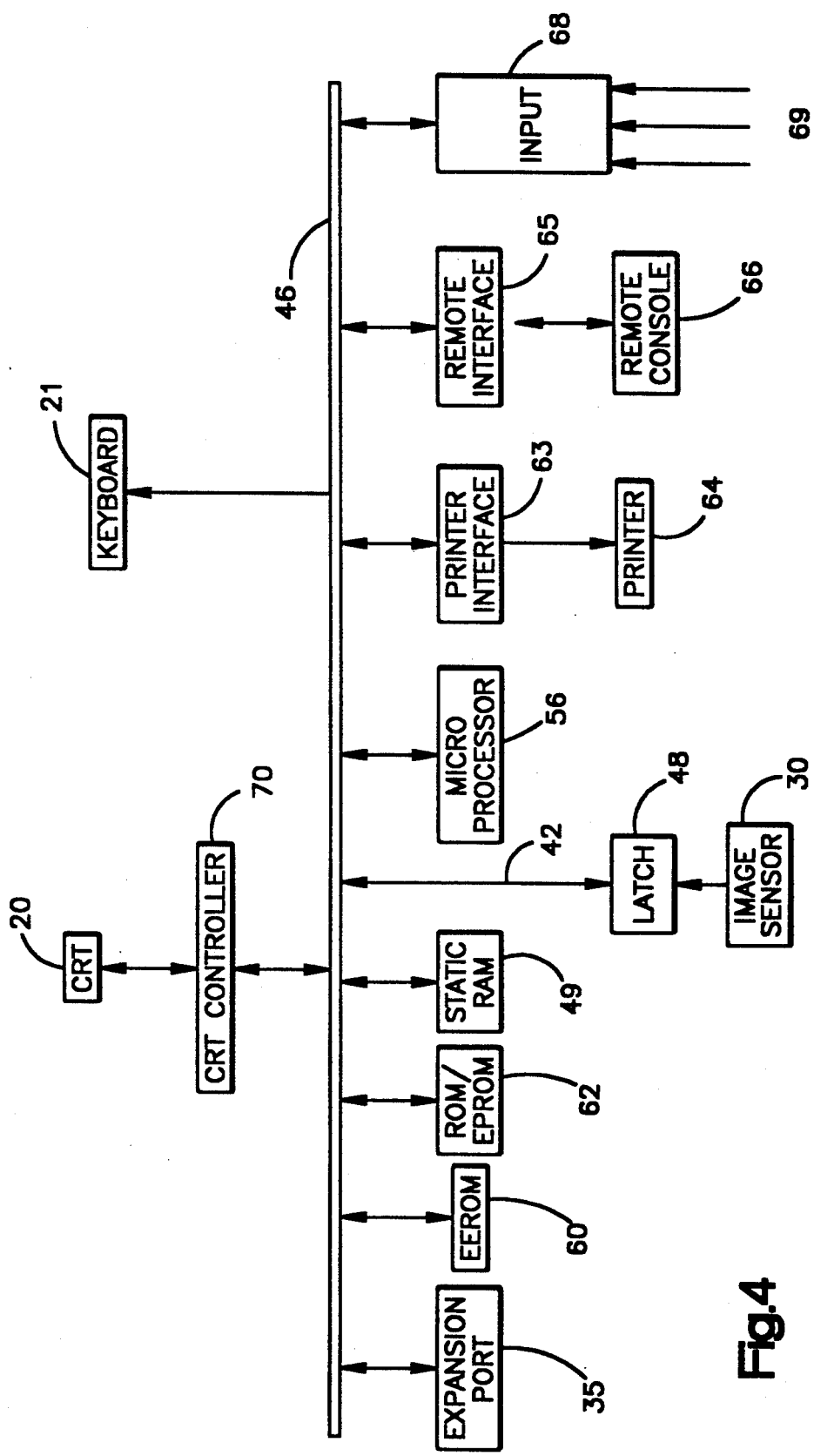
FIG. 4 is a schematic, block diagram of the electronic controls according to the invention.

In FIG. 4, one embodiment of electronic controls for the headlight aiming apparatus and method is schematically shown. Input and output information and control signal interconnections are indicated with identical reference numerals in FIGS. 3 and 4. For example, data on light intensity and position from image sensor 30 is passed along line 42 to the circuitry of FIG. 4.

The circuitry of FIG. 4 is intended to be used with an image sensor like the TC211 that produces signals indicative of the light intensity, and that transfers pixel information of the light intensity to a microprocessor 56. Image sensor 30 is in direct communication with bus 46 through flash convert/condition latch 48.

The digital information from flash convert/condition latch 48 is passed along a data bus 46 to microprocessor 46. Microprocessor 56 then stores the information in static Random Access Memory (RAM) 49. Static RAM 49 is accessible to determine aim and light intensity patterns. Video images are also stored in static RAM 49. The microprocessor 56 executes a computer program stored in a Read Only Memory/Electrically Programmable Read Only Memory (ROM/EPROM) 62. 128 K of memory for ROM/EPROM 62 has proven sufficient for storing the software for operating the novel aiming and light pattern device. Microprocessor 50, EEROM 60, static RAM 49 and ROM/EPROM 62 are in direct communication through data bus 46.

A printer interface 63, which for example, can be monitor and power port 33 (FIG. 3), is in communication with data bus 46 and can be employed to drive a printer 64 for displaying visual output data. The visual output data may be alphanumeric print-outs as in Table I below, or can be graphical displays as in FIG. 5.

A remote control interface 65 can be included with data bus 46 to drive a remote console 66 so that the aiming device may be controlled at a location remote from the testing location. Preferably, remote interface 65 is a conventional RS232 port. Remote control and monitoring of the apparatus can be particularly useful in vehicle assembly plants. In servicing existing vehicles, an integrated unit like that of FIG. 1 is preferred so that interface 65 and console 66 are likely to be absent.

An input interface 68 in communication with data bus 46 allows various digital inputs 69 to be supplied to the microcomputer.

CRT controller 70 on data bus 46 controls the output of information to the CRT 20. CRT controller 70 includes appropriate RAM for proper functioning of the CRT. Preferably, keyboard 21 and CRT 20 are interactive so that a human operator can initiate operation of the apparatus and generally control its function.

As explained below, under control of the program resident in ROM/EPROM 62, the apparatus can produce an electrical error signal indicating the amount and direction by which a headlight is incorrectly aimed. This error signal can be supplied through bus 46 to CRT controller 70 to CRT 20 to indicate necessary adjustment.

The operation of the apparatus and the novel method are best illustrated by specific examples. In the described examples, a CCD IC is employed as image sensor 30 and SAE standards are used as a reference for the determining aiming accuracy and desired beam pattern. The particular software stored in ROM/EPROM 62 controls the particular test standard applied. By modification of the computer program, different standards, such as subsequent modifications to SAE standards, European standards or newly promulgated government standards, can be incorporated into the operation of the apparatus. The stored program can be easily changed, for example by providing additional software in an expansion port 35, or by reprogramming ROM/EPROM 62.

When the equipment is reset or first energized, microprocessor 56 executes diagnostic routines to ensure that the equipment is operating correctly. Thereafter, lens 9 is centered with respect to headlight 10. Centering may be accomplished by pivotally moving probe 36 from a stored position to a centered position with respect to lens 9, and by orienting pointer 39 with respect to the center mark on headlight 10.

Once the headlight has been centered, its aim and/or radiation pattern is tested. In a headlight containing dual filaments and used for both low beam and high beam illumination, only low beam aim is normally checked. In this explanation it is assumed that separate low beam and high beam lamps are employed, and that the low beam and high beam lamps are being tested in that order. The headlight is illuminated so that an image formed on screen 28 reflects off screen 28 and is recorded by image sensor 30.

In the SAE test using a standard 25 foot separation between a headlight and a screen, the illuminated area of interest is 87.1 inches high by 107.5 inches wide. In a preferred embodiment of the invention, a data matrix containing 131,070 data elements of light intensity and related location are stored in Static RAM 44. This number of data elements corresponds to a matrix containing 192 columns and 165 rows. If image sensor 30 contains a larger number of light sensors than the desired number of cells, the designed number of cells can be obtained by ignoring the measurements of certain light sensors or by averaging the measurements of adjacent light sensors to achieve the desired number of data elements.

Each matrix cell represents an area of about 0.42 inch in width and 0.36 inch in height. Since the image formed on the screen in the novel apparatus is smaller than the SAE pattern at 25 feet, each light intensity cell on screen 28 is actually much smaller than 0.42 inch by 0.36 inch. However, for a 192 by 165 matrix, each cell corresponds to a 0.42 inch by 0.36 inch area of the SAE standard pattern. Different matrix cell sizes can produce finer or coarser divisions of the SAE standard lamp illumination pattern.

The SAE low beam aiming standard specifies that two points having a fixed geometrical relationship to each other must also have a particular intensity relationship. One of the points must lie on the horizontal axis 2° to the right from the intersection of orthogonal horizontal and vertical axes and have an intensity equal to 20% of the maximum low beam intensity. The other point must lie on the vertical axis 1° below the intersection of the horizontal and vertical axes and have an intensity of 30% of the maximum low beam intensity. Once these points are found, the axes are "drawn" and the location of the intersection of the axes is determined. The location of that intersection is compared to the intersection of horizontal and vertical axes on a vehicle, as specified by the SAE, a calculation is then made to determine the accuracy of headlamp aim.

In a preferred embodiment of the invention, the light intensity value in each cell in the matrix is digitized. The digital signals containing light intensity are referred to as pixels. Microprocessor 56 sorts through the pixels in this and other tests, and determines the brightest intensity. In sorting through the pixels, it may be desirable to average a pixel with each of its immediately adjacent neighbors to avoid false readings. The averaging can eliminate errors that might be introduced by isolated blemishes that can reduce sensitivities of a few of the light intensity sensors in a CCD IC.

Figure 5:
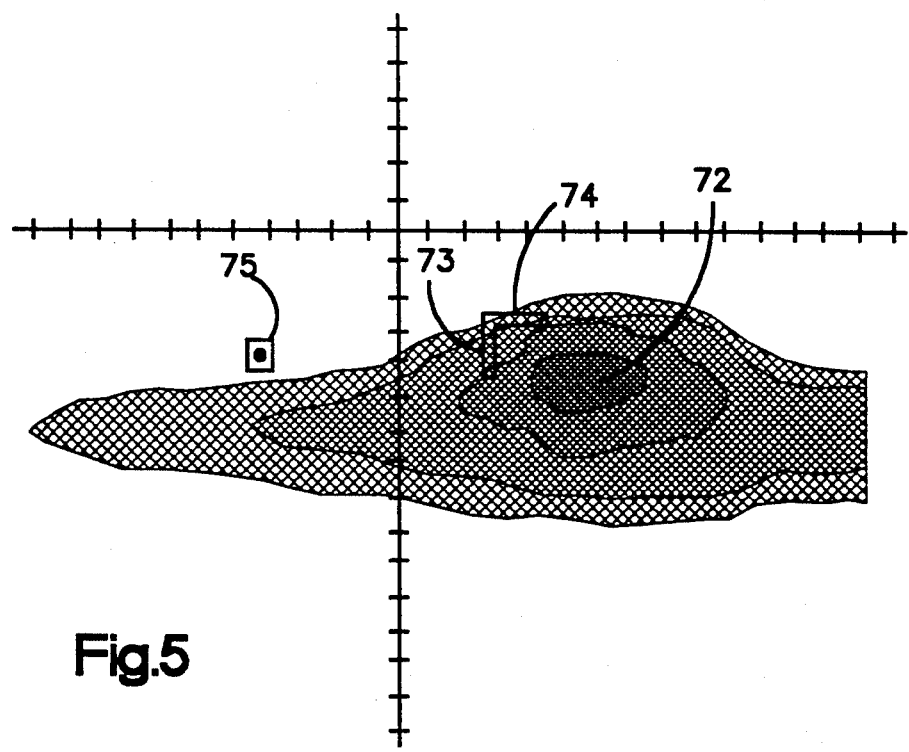
FIG. 5 is a graphical display on a printer of an intensity pattern of a vehicle headlight produced according to the invention.

Once the brightest light intensity pixel has been located, for example as indicated graphically at 72 in FIG. 5, its intensity is preferably compared to a minimum acceptable threshold. If the light intensity of the brightest pixel is below the threshold, an error message is produced so that the operator may determine whether the headlight is obstructed or defective and whether to continue the test or to replace the lamp. Assuming the minimum brightest intensity criterion is met, microprocessor 56 next calculates the 20% and 30% intensity levels. Thereafter the program determines whether points having the SAE-specified intensity and geometrical relationships exist.

In a preferred pixel-scanning routine, the software begins searching a pixel column to the right of the location of the brightest light. Once the calculated 20% of highest intensity light value is encountered in that column, the software scans the pixel matrix the equivalent, on the standard SAE size image, of 2° to the left and 1° down. That is, for the preferred embodiment employing 192 columns and 165 elements, the matrix search shifts 25 columns to the left and 8 columns down.

The pixel thus located is tested to determine whether its brightness is 30% of the maximum. If not, the search returns to one column to the left of the original search location. The comparison process in continually reiterated until the SAE-specified geometrical and light intensity relationships are satisfied. Once these relationships are satisfied, orthogonal horizontal and vertical axes, for example as indicated graphically at 73, 74 respectively, in FIG. 5, are drawn through the 20% and 30% intensity points. The location of the intersection of these axes is calculated by microprocessor 56 at the direction of the software resident in ROM/EPROM 62.

The location of the intersection calculated from the measured light intensities is compared to the location of the mechanical intersection specified by the SAE. The location of the mechanical intersection may be supplied to the apparatus by an operator via keyboard 21 or may be stored in the EEROM 60 for reference. Microprocessor 56 can then calculate any variance between the mechanical intersection and the intersection calculated from the measured light intensities to determine if the headlight is aimed within the degree of accuracy prescribed by the SAE, manufacturer or governmental agency. For example, deviations of no more than 3/10 of an inch vertically and horizontally may be permitted. The results of the aiming accuracy calculation may be displayed on CRT 20.

If the headlight is grossly misaimed or defective, it is possible that the points having the light intensity and geometrical relationships specified in the SAE standards will not be located. If after an established amount of scanning of the pixels, points satisfying the SAE criteria are not located, an error message is output by the apparatus on CRT 20. In that event, a substantial, coarse reaiming of the headlight may be made followed by a repetition of the low beam aiming routine. Alternatively, the lamp is replaced.

The SAE standards for aiming high beam lamps are different from the low beam standard, necessitating use of a different aiming program. As noted above, where dual beam lamps are used, only the low beam needs to be aimed. However, since separate high beam lamps are commonly used presently, a separate high beam aiming procedure should be available. In the first step of the high beam method, the lamp is centered with respect to the lens of the aiming device in the manner already described for aiming a low beam lamp. Thereafter, the high beam lamp is illuminated and the pattern of light produced on screen 28 is recorded by image sensor 30.

Since high beam lights are intended for long distance illumination, the mechanical axis intersection for the vehicle and the intersection of the horizontal and vertical axes of symmetry of the light beam are essentially coincident. In order to determine the location of the intersection of the orthogonal horizontal and vertical axes of the light pattern, a symmetry test is performed using the microprocessor to analyze the pixels.

Light intensity values on the left and right sides of the pattern are evaluated to locate a horizontal axis in which the best balance between the pixels on either side of the axis is obtained. Likewise, the same balancing technique is applied for the vertical axis in the upper and lower half of the light pattern.

For example, light intensities of all of the pixels lying on one side of an arbitrary horizontal axis are compared to the light intensities of all the pixels lying on the other side of the arbitrary horizontal axis. The comparison of the pixels is continued as the position of the arbitrary horizontal axis is shifted until a perfect balance or the most nearly perfect balance obtainable is achieved. The horizontal axis is established at that balance position. The vertical axis is similarly located.

Once the horizontal and vertical axes have been determined by microprocessor 56 employing the balancing routine from the program stored in ROM/EPROM 62, the location of the intersection of the horizontal and vertical axes is calculated. This location is compared to the mechanical axis specified by the SAE to determine if the difference is within the prescribed degree of accuracy.

As with the low beam aiming method, any deviation between the mechanical and optical axes may be displayed on CRT 20. If a sufficient error exists, an electrical error signal is produced indicating the direction and degree of error.

By use of a microprocessor and related memories of sufficient capacity, the aiming methods can be carried out quickly. For example a matrix of 61,000 pixels can be digitized in about 1/60 second. Completion of the aiming calculations can be rapidly completed so that the accuracy of the aim can be determined and, if necessary, adjusted in no more than a minute in an automated apparatus. This rapid response is particularly important in vehicle manufacture and represents a substantial improvement compared to the mechanical/optical, conventional aiming devices.

Since the novel method and apparatus determines light intensity at each pixel in a matrix covering all or nearly all of the illumination pattern produced by the headlight, the invention may also be used to determine whether the pattern meets established illumination pattern standards.

For example, the SAE specifies illumination beam standards consisting of a maximum, a minimum or a range of light intensity for each of a number of locations in an illumination pattern. Different test points intersection of the orthogonal horizontal and vertical axes is determined for a lamp. It is a simple matter, using the pixel matrix, to test the specified points to determine whether the light pattern meets the SAE standard. As before, applying different standards would be a simple matter in the invention, merely requiring alteration of the program stored in ROM/EPROM 62.

In addition to testing the light intensity at discrete points within the illumination pattern of a headlight, the pixel matrix provides the ability to produce a graphical plot of the illumination beam. Because of the digitization of the light intensity levels, it is a relatively simple matter to determine the location of contours of uniform light intensity within the radiated pattern. These contours, referred to as isocandela lines, may be displayed in a number of ways in the invention. For example, the lines themselves can be drawn on printer 64 to produce a plot resembling a topographical map. In addition, if printer 64 has color capabilities, a false color can be assigned to each region between adjacent isocandela lines. A multiple color display can readily illustrate the light intensity pattern of a headlight. The same visual effect can be presented in black and white by controlling the intensity (or grey scale) of the display between isocandela lines on a CRT.

An example of a black and white graphical display is shown in FIG. $ for low beam lamps. A graphical display for high beam lamps would render a similar display. This figure is further understood when taken in conjunction with Table I, which represents application of the SAE illumination pattern standard tests to the illumination patterns displayed in FIG. 5.

TABLE I

| PNT. NO. | LOCATION | | PASSING RANGE (MIN.-MAX.) | MEASURED CANDELA | |
|---|---|---|---|---|---|
| 01 | 10.0U | 0.0R | (0-125) | 00 | |
| 02 | 1.0U | 1.5L | (0-700) | 00 | |
| 03 | 0.5U | 1.5L | (0-1000) | 00 | |
| 04 | 0.5D | 1.5L | (0-2500) | 970 | |
| 05 | 1.5U | 1.0R | (0-1400) | 00 | |
| 06 | 0.5U | 1.0R | (0-2700) | 300 | |
| 07 | 0.5U | 2.0R | (0-2700) | 630 | |
| 08 | 0.5U | 3.0R | (0-2700) | 790 | |
| 09 | 0.5D | 1.5R | (8000-20000) | 7760 | FAIL |
| | 0.25D | 0.25R | 00 | 9030 | PASS |
| 10 | 1.0D | 6.0L | (750-75000) | 510 | FAIL |
| | 0.25D | 0.25R | 00 | 1140 | PASS |
| 11 | 1.5D | 2.0R | (15000-75000) | 15720 | |
| 12 | 1.5D | 9.0L | (750-75000) | 930 | |
| 13 | 1.5D | 9.0R | (750-75000) | 2240 | |
| 14 | 4.0D | 4.0R | (0-12500) | 2920 | |
| 15 POINTS TESTED. | | | 2 RETESTED. | 0 FAILED | |

Fourteen of the specified SAE test points for a low beam headlight are displayed in Table I. Table I contains in its first column the identifying point or location numbers as specified by the SAE. In the second and third columns, the coordinates of the test point in degrees referred to the horizontal and vertical axis intersection as measured on an illumination pattern projected on a screen located 25 feet from the headlight are listed. The suffixes, U,D,R and L refer to up and down, right and left, with respect to the intersection of the horizontal and vertical axes.

Each of these measured locations is indicated in FIG. 5 by a dot. In the fourth column, the light intensity standard specified for each point is stated in candela units. The last column contains the actual measured light intensity, in candela, derived from the pixel at the specified location.

In the illumination pattern measurements, absolute light intensity is measured. In the aiming procedures, relative light intensities may be sufficient. In order to measure absolute intensities, the novel instrument is calibrated using a light intensity standard lamp having a known illumination pattern and light intensity. In either case, relative light intensity is sensed, with either a "floating" reference or an absolute reference derived from the calibrated standard lamp.

As is apparent from a comparison of Table I and FIG. 5, the printed areas in FIG. 5 represent a number of illumination levels, but some light is also present outside the printed area, i.e. beyond what may appear to be the limit of illumination pattern in FIG. 5. As indicated in Table I, an initial test at SAE point 9 resulted in an intensity that exceeded the upper limit specified by the SAE.

In a preferred embodiment of the invention, additional tests are made near a point where the initial test fails. The SAE standards permit a tolerance of 0.25° in the location of the test point. In response to a test failure, pixels within 0.25° of the failure point are recovered individually from the matrix and their indicated light intensities are applied against the SAE test. This re-testing is continued until the established SAE criteria is met or until all of the pixels within 0.25° of the specified point have been tested and failed the test.

Table I is an example of a visual display describing illumination pattern that may be prepared by the invention. Preferably, an indication of a test failure, such as the one shown in Table I is supplied. There, the test failure is noted and each of the retested points are indicated to show that the test has been ultimately passed or failed. Likewise, in FIG. 5, an indication is made of an initial failure of a test point to meet the SAE standards. In the embodiment shown, a square, indicated at 75, has been drawn around the initially failed test point.

The graphical display of FIG. 5 can also be reproduced on CRT 20 as a visual indication of a headlight intensity pattern, as shown in FIG. 6. The isocandela lines can be appropriately drawn and shaded to resemble a topographical map. The vertical and horizontal axes 73, 74, representing the 20% and 30% intensity points respectively, can also be included on CRT 20.

To indicate deviations from a properly aimed headlight, a number of graphical and digital representations can be included on CRT 20. For example, an additional set of vertical and horizontal axes 76, 77, respectively, can be displayed along side of the CRT screen. These axes can include indexed graduations indicating inches of deviation per 25 feet. The graphical display of the intensity pattern can be compared with the graduated axes to determine the deviation from a properly aimed headlight.

Moreover, cursors 80, 81 can be included along the sides of graduated axes 76, 77 respectively, to indicate the deviation of the measured intensity pattern from the proper intensity pattern. In particular, the moveable cursors 80, 81 are aligned and move in conjunction with horizontal and vertical axes 73, 74, respectively. For example, a vertical displacement of the 20% intensity point will move axis 74 appropriately, and will simultaneously displace cursor 80 along vertical graduated axis 76 to indicate the deviation in inches per 25 feet.

In addition to cursors 80, 81, an aiming circle 82 can be included on CRT 20 to digitally and graphically indicate deviation and direction for corrective adjustment from the properly aimed headlight. In particular, aiming circle 82 can be separated into quarters to indicate relative upwards, downwards, or left or right corrections.

Figure 7:
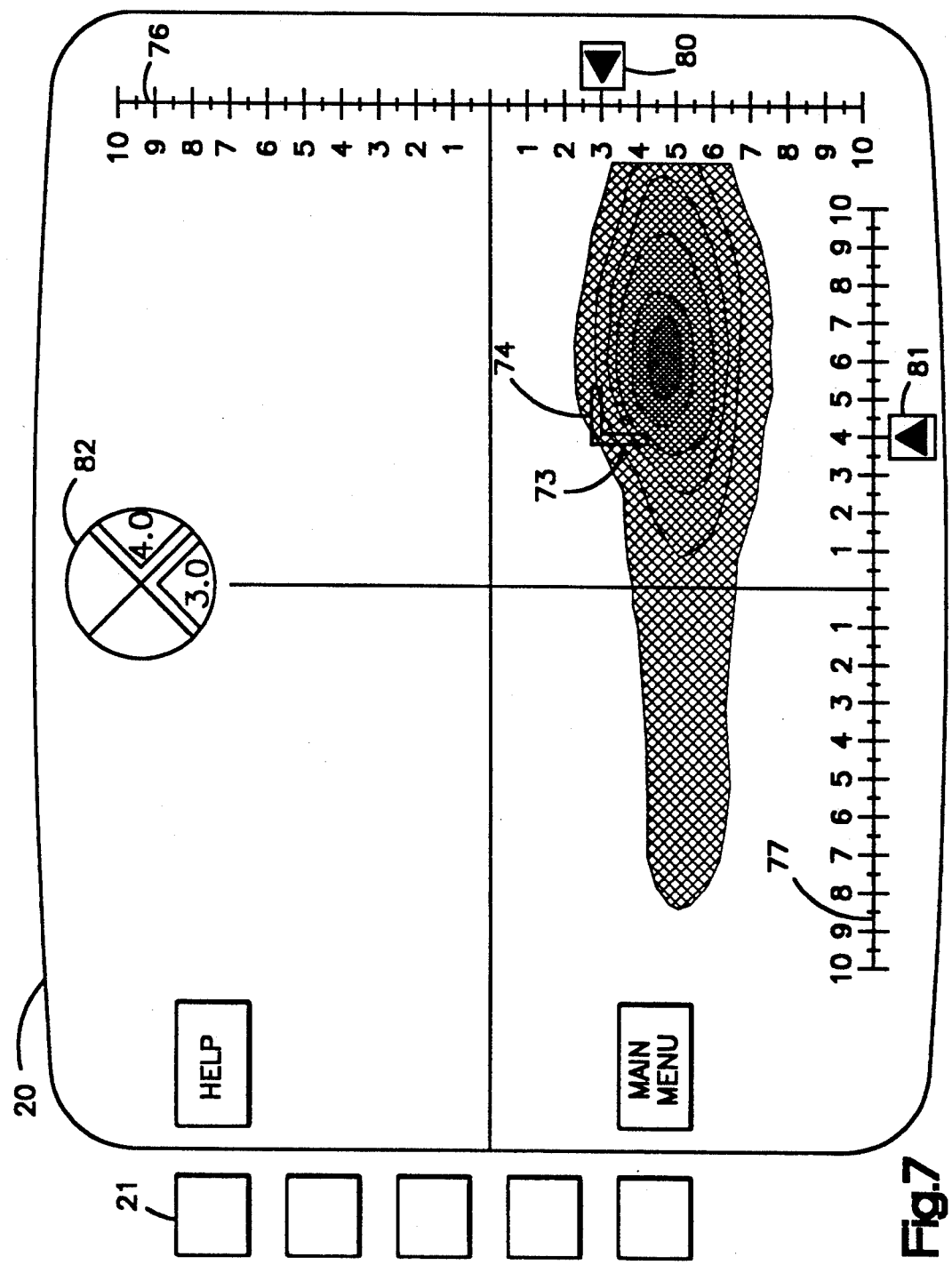
FIG. 7 is a graphical display on a CRT of an intensity pattern of a vehicle headlight, illustrating an improperly aimed vehicle headlight.

For example, as shown in FIG. 7, an improperly aimed headlight produces intensity patterns on the CRT that deviate from a properly aimed headlight. The deviation can be determined by comparing the horizontal and vertical axes 73, 74 to the graduated axes 76, 77. Moreover, the deviation can be determined by noting the movement of cursors 80, 81 along the graduated axes 76, 77. In the illustrated example, a vertical deviation of 3 inches, and a horizontal deviation of 4 inches is indicated by cursors 80, 81, respectively. Similarly, aiming circle 82 indicates a 3 inch vertical and 4 inch horizontal deviation in appropriate quarters of the circle and the direction of correction.

Figure 8:
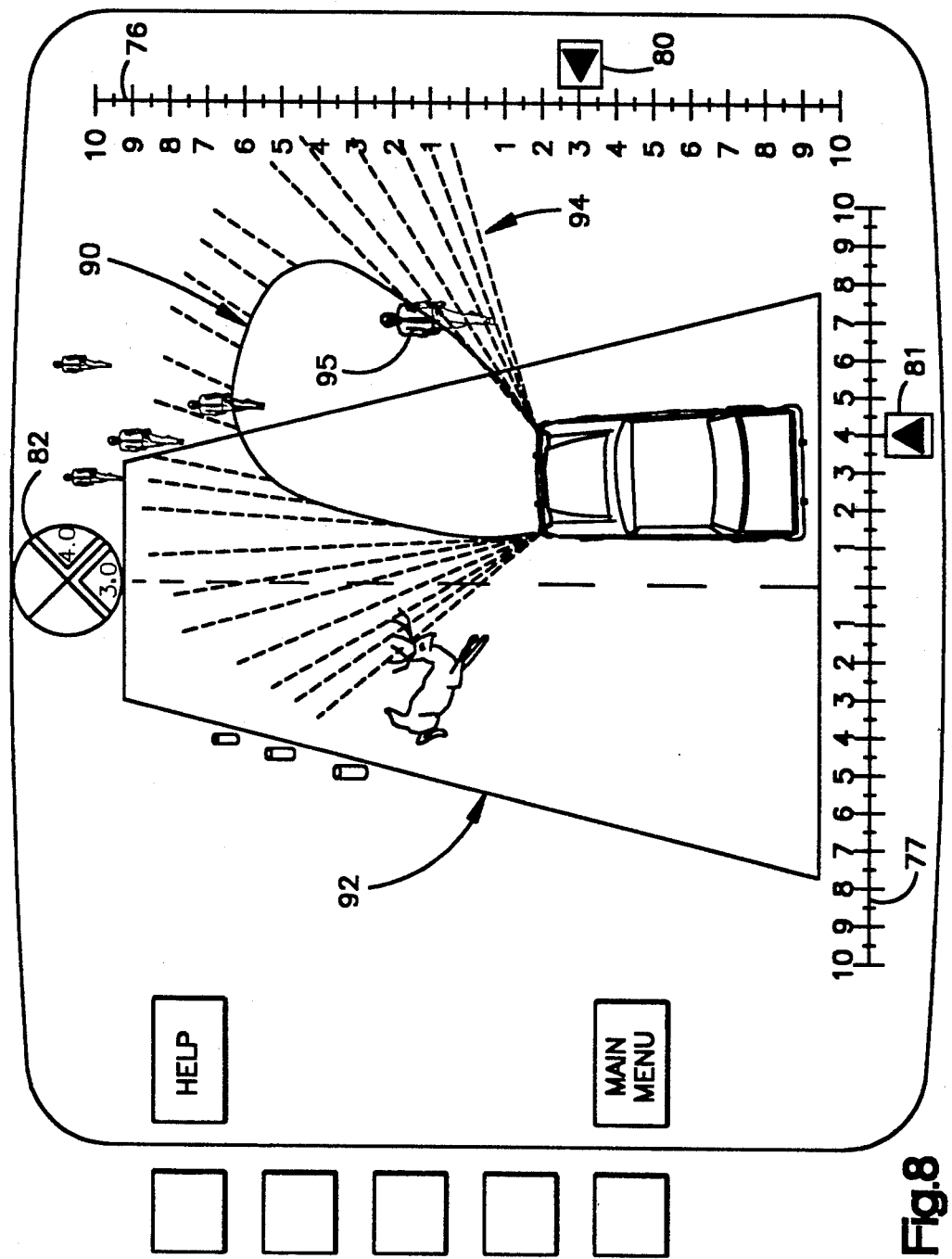
FIG. 8 is a CRT display of a simulated light beam illuminating a simulated road surface, illustrating an improperly aimed headlight.
Figure 9:
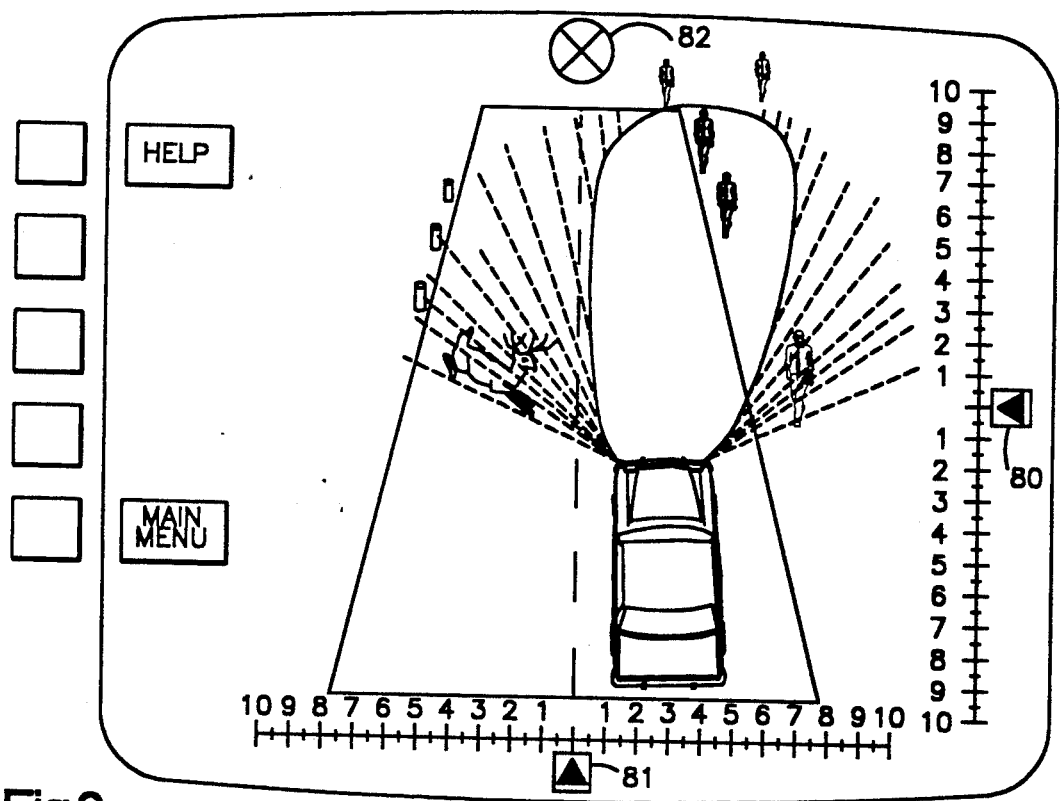
FIG. 9 is a CRT display of a simulated light beam illuminating a simulated road surface, illustrating a properly aimed vehicle headlight.

Referring now to FIGS. 8 and 9, the headlight intensity pattern can also be displayed on the CRT as a simulated headlight beam 90, indicated generally at 90. The headlight beam can be represented as emanating from a simulated vehicle 91. Moreover, the pattern can be displayed on a simulated road surface, indicated generally at 92, having exemplary objects such as deer, people, highway cones, etc. (unnumbered) simultaneously displayed thereon.

The simulated headlight beam, road surface, vehicle and exemplary objects are provided by the ROM/EPROM 62 (FIG. 4) and the microprocessor. The exemplary objects are primarily designed to indicate the relative distance and orientation of the headlight illumination pattern with respect to a typical road surface. The headlight beam 90 includes a beam print on the road surface of maximum illumination that gradually tapers into areas of reduced illumination, indicated generally at 94, as is typical of conventional headlights.

The objects are preferably indicated in black on a white background in locations where the headlight beam is aimed, such as for example as indicated at 95, and in black on a grey background in the reduced illumination area 94. In the areas where the headlight beam is not aimed, the objects are generally not visible. Additionally, the location of the objects, and in particular the highway cones, can correspond to specific distances along the road surface to further indicate the effectiveness of the headlight.

Vertical and horizontal axes 76, 77, cursors 80, 81 and aiming circle 82 can be included with the simulated headlight intensity patterns of FIGS. 8 and 9 to indicate the relative deviation from a properly aimed headlight pattern.

The visual image of the headlight pattern portrayed on CRT 20 as a simulated headlight pattern impresses upon the motorist the importance of a properly aimed headlight. The exemplary objects provide an indication of the distance and orientation of the illumination pattern on the road surface.

To provide a comparison between the measured headlight and a properly aimed headlight, ROM/EPROM 62 (FIG. 4) can selectively provide a visual display of a properly aimed headlight, as shown in FIG.

9. The selection of the respective display can be provided by actuating an appropriate key on keyboard 21. As before, cursors 80, 81 and aiming circle 82 indicate when the proper aim of the headlight has been achieved.

During the analysis of the aim of the headlight, the screws 41 (FIG. 3) on frame 40 can be adjusted at any point to re-orient the headlight. As the headlight is adjusted, cursors 80, 81 and aiming circle 82 simultaneously reflect the change in orientation. Accordingly, as the headlight is adjusted towards the proper orientation, the cursors 80, 81 approach the "0" graduation, and an "Aim OK" message can be displayed on CRT 20.

The flexibility and advantages of the invention are apparent from the foregoing description. By measuring light intensity at each cell in a large, continuous matrix of cells covering an illumination pattern, nearly any desired information concerning headlight aiming, illumination beam pattern or other headlight illumination characteristic can be determined. Once a desired characteristic to be determined has been chosen, apparatus according to the invention can be adapted to produce the needed information merely by supplying the appropriate program instructions through ROM/EPROM 62. Any governmental and/or industrial tests and standards can be incorporated in the method of the invention simply by incorporating new software in expansion port 35 or by revising the software resident in ROM/EPROM 62.

Moreover, the illumination pattern of the headlight can be displayed on a video terminal as a simulated light beam, and can be selectively compared to a properly aimed, simulated light beam to indicate deviations in the headlight aiming.

The invention has been described with respect to certain embodiments. Modifications and additions within the spirit of the invention will occur to those of skill in the art. Accordingly, the scope of the invention is limited solely by the following claims.

What is claimed is:

1. A method of aiming a vehicle headlight, comprising:
   projecting a light beam from a vehicle headlight onto a reflective surface,
   sensing the intensity of the projected light beam in each cell in a matrix of cells overlying the reflected light beam and generating for each cell an electrical signal indicative of the intensity of the light beam in the cell,
   comparing at least some of the electrical signals to each other to determine whether the light beam is aimed within a prescribed degree of accuracy,
   selectively displaying at least some of the electrical signals as a simulated light beam to visually describe the light intensity pattern of the vehicle headlight on a simulated road surface,
   selectively displaying a simulated light beam for a properly aimed headlight on the simulated road surface to indicate the relative difference between the vehicle headlight intensity pattern and a properly aimed headlight intensity pattern.

2. A method as in claim 1, further including locating simulated exemplary objects at selected locations along the road surface to indicate relative distances along the surface, the simulated vehicle light beam and the properly aimed light beam illuminating selected objects on the road surface depending upon the relative direction of the intensity patterns.

3. A method as in claim 1, further including displaying graduated axes to indicate the relative deviation of the vehicle headlight light beam and the properly aimed headlight light beam, one of said axes extending vertically with respect to the headlight light beams and another of said axes extending horizontally with respect to the headlight light beams.

4. A method as in claim 3, further including cursors moveable with respect to the vertical and horizontal axes to indicate the relative deviation of the vehicle headlight light beam and the properly aimed headlight light beam.

5. A method as in claim 1, further including displaying an aiming circle to graphically and digitally indicate the relative deviation of the vehicle headlight light beam and the properly aimed headlight light beam.

6. A method as in claim 1, further including adjusting the aim of the headlight in accordance with the displayed relative difference between the vehicle headlight light beam and the properly aimed headlight light beam and concurrently displaying the adjusted vehicle headlight light beam.

7. A method as in claim 1, wherein said simulated vehicle headlight light beam and said properly aimed vehicle light beam are displayed on a video display.

8. An apparatus for aiming a vehicle headlight, comprising:
   centering means for aligning the headlight with the apparatus,
   sensor means for sensing the intensity of a light beam from the headlight in each cell in a matrix of cells overlaying the reflected light beam, said sensor means including means to generate an electrical signal for each cell from said sensor means indicative of the intensity of the light beam in the cell,
   means to compare at least some of the electrical signals to each other to determine whether the light beam is aimed properly within a prescribed degree of accuracy,
   means for selectively displaying at least some of the electrical signals as a simulated light beam to visually describe the light intensity pattern of the vehicle headlight on a simulated road surface, and
   means for selectively displaying a simulated light beam for a properly aimed headlight on the simulated road surface to indicate the relative distance between the vehicle headlight intensity pattern and the properly aimed headlight intensity pattern.

9. An apparatus as in claim 8, further including means for concurrently displaying adjustments to the vehicle headlight made according to the relative difference between the simulated vehicle light beam and the properly aimed light beam.

10. An apparatus as in claim as in claim 8, wherein said sensor means includes a CCD IC, said CCD IC including means for sensing the intensity of a reflected light beam.

11. A method of aiming a vehicle headlight, comprising:
   projecting a light beam from a vehicle headlight onto a reflective surface,
   sensing the intensity of the projected light beam in each cell in a matrix of cells overlying the reflected light beam and generating for each cell an electrical signal indicative of the intensity of the light beam in the cell, comparing at least some of the electrical signals to each other to determine whether the light beam is aimed within a prescribed degree of accuracy, displaying at least some of the electrical signals as a simulated light beam to visually describe the light intensity pattern of the vehicle headlight, concurrently displaying an indicating device to digitally indicate the relative deviation of the vehicle headlight light beam and the properly aimed headlight light beam, adjusting the aim of the headlight in accordance with the indicated relative deviation, and concurrently displaying a simulated light beam to visually describe the adjusted vehicle headlight intensity pattern.

12. A method of aiming a vehicle headlight, comprising:

projecting a light beam from a vehicle headlight onto a reflective surface, sensing the intensity of the projected light beam in each cell in a matrix of cells overlying the reflected light beam and generating for each cell an electrical signal indicative of the intensity of the light beam in the cell, comparing at least some of the electrical signals to each other to determine whether the light beam is aimed within a prescribed degree of accuracy, displaying at least some of the electrical signals as a visual description of the light intensity pattern of the vehicle headlight, concurrently displaying an indicating device to digitally indicate the relative deviation of the vehicle headlight light beam and the properly aimed headlight light beam, said indicating device including cursors moveable with respect to the vertical and horizontal axes to indicate the relative deviation of the vehicle headlight beam and the properly aimed headlight beam, adjusting the aim of the headlight in accordance with the indicated relative deviation, and concurrently displaying the adjusted vehicle headlight intensity pattern.

13. A method of aiming a vehicle headlight, comprising:

projecting a light beam from a vehicle headlight onto a reflective surface, sensing the intensity of the projected light beam in each cell in a matrix of cells overlying the reflected light beam and generating for each cell an electrical signal indicative of the intensity of the light beam in the cell, comparing at least some of the electrical signals to each other to determine whether the light beam is aimed within a prescribed degree of accuracy, displaying at least some of the electrical signals as a visual description of the light intensity pattern of the vehicle headlight, concurrently displaying an indicating device to digitally indicate the relative deviation of the vehicle headlight light beam and the properly aimed headlight light beam, said indicating device including an aiming circle to graphically and digitally indicate the relative deviation of the vehicle headlight beam and the properly aimed headlight beam, adjusting the aim of the headlight in accordance with the indicated relative deviation, and concurrently displaying the adjusted vehicle headlight intensity pattern.

14. A method of aiming a vehicle headlight, comprising:

projecting a light beam from a vehicle headlight onto a reflective surface, sensing the intensity of the projected light beam in each cell in a matrix of cells overlying the reflected light beam and generating for each cell an electrical signal indicative of the intensity of the light beam in the cell, comparing at least some of the electrical signals to each other to determine whether the light beam is aimed within a prescribed degree of accuracy, displaying at least some of the electrical signals as a visual description of the light intensity pattern of the vehicle headlight, wherein at least some of the electrical signals are displayed as a simulated light beam on a simulated road surface to visually describe the light intensity pattern of the vehicle headlight, concurrently displaying an indicating device to digitally indicate the relative deviation of the vehicle headlight light beam and the properly aimed headlight light beam, adjusting the aim of the headlight in accordance with the indicated relative deviation, and concurrently displaying the adjusted vehicle headlight intensity pattern.

* * * * *